3,478,775
PRESSURE RELIEF VALVE
Morley V. Friedell, Wheatridge, Colo., assignor to Martin-Marietta Corporation, New York, N.Y., a corporation of Maryland
Filed Aug. 27, 1965, Ser. No. 483,039
Int. Cl. F16k 1/36, 31/06, 31/36
U.S. Cl. 137—489.5     13 Claims

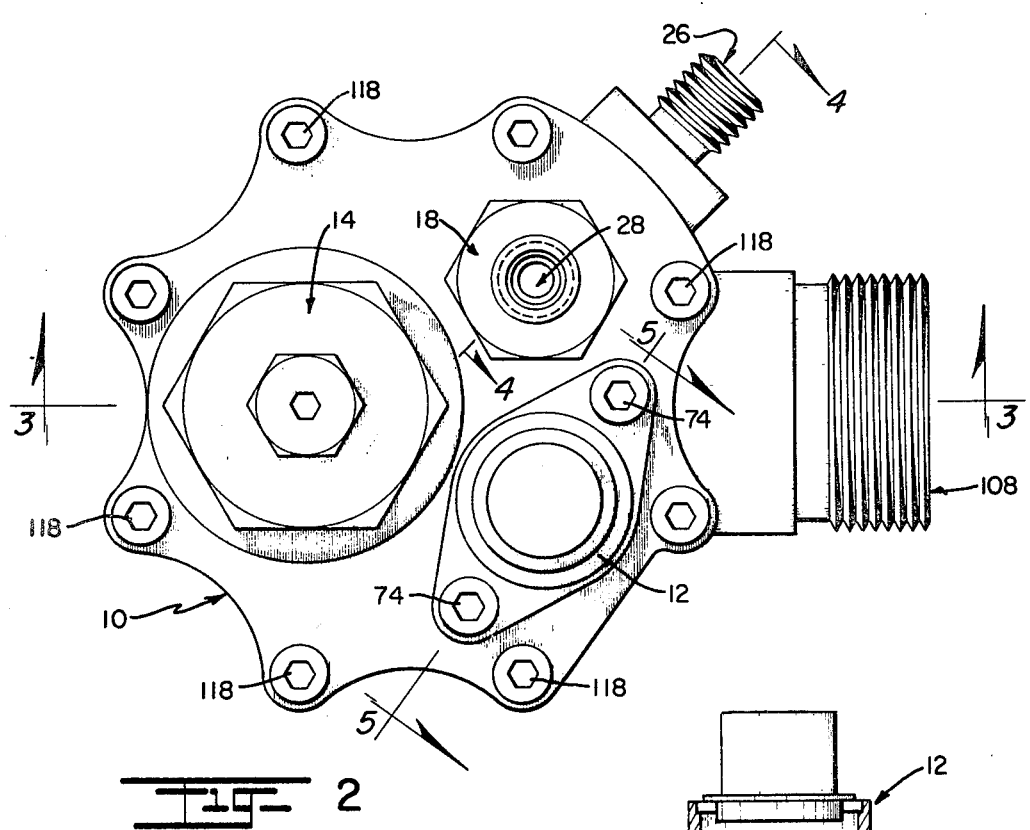
Fig. 2
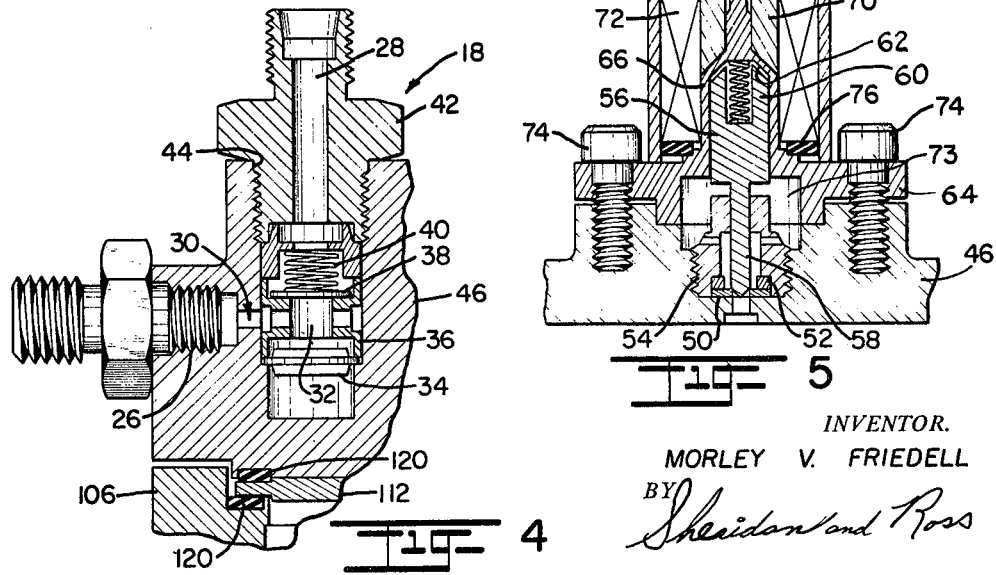
Fig. 4
Fig. 5
INVENTOR.
MORLEY V. FRIEDELL
BY Sheridan and Ross
ATTORNEYS Nov. 18, 1969  M. V. FRIEDELL  3,478,775
PRESSURE RELIEF VALVE
Filed Aug. 27, 1965  3 Sheets-Sheet 3
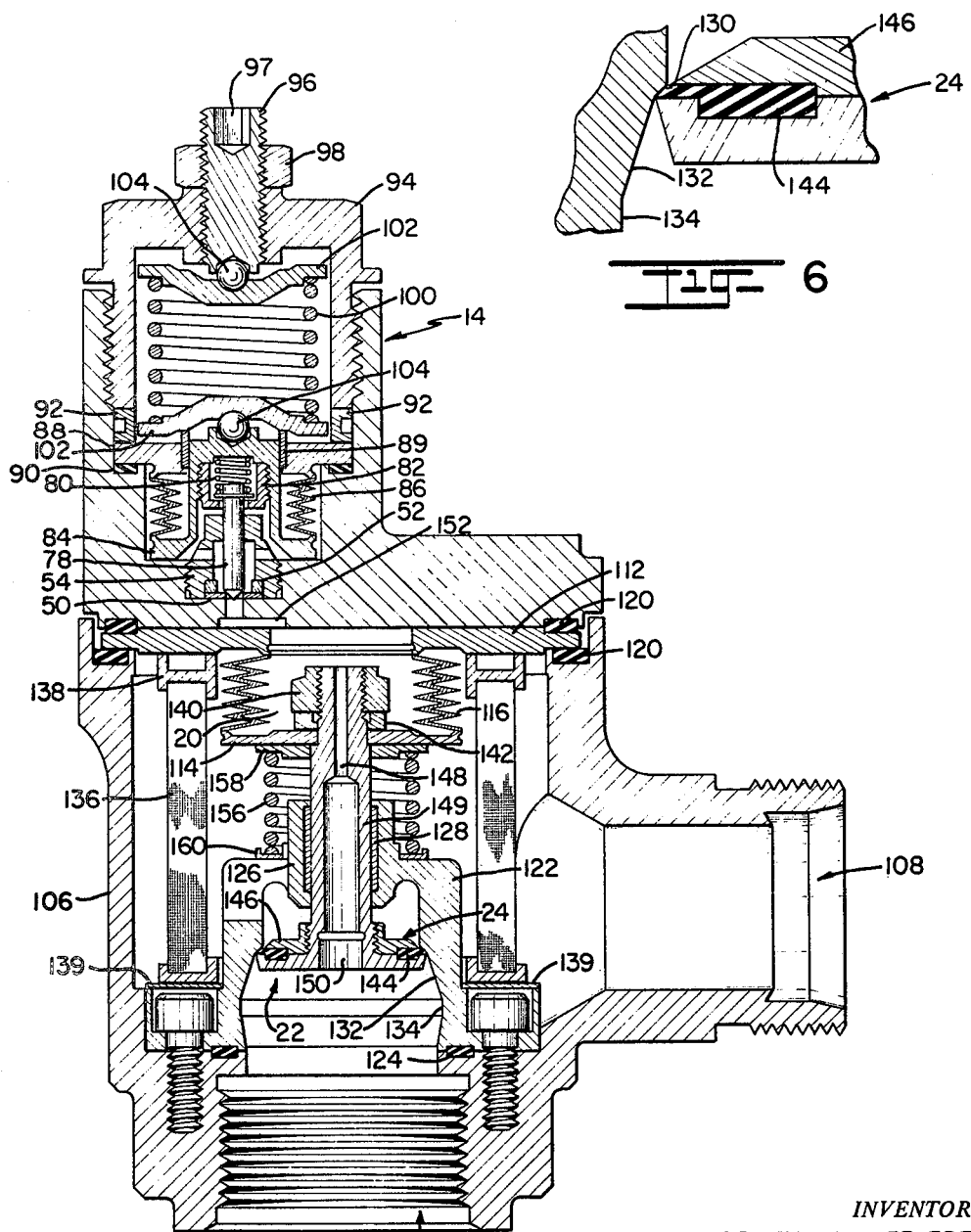
INVENTOR.
MORLEY V. FRIEDELL
BY *Sheridan and Ross*
ATTORNEYS

United States Patent Office 3,478,775
Patented Nov. 18, 1969

ABSTRACT OF THE DISCLOSURE

The pressure relief valve includes a valve poppet and valve seat configured so that at critical pressure, i.e., pressure at which the valve is regulating pressure, sonic flow is confined to the choke flow region at the periphery of the poppet. Also, the configuration provides a pressure affected area for the valve which does not change throughout the operating stroke of the poppet and thereby maintains a constant force on the upstream side of the poppet tending to keep the poppet open. This provides a very stable valve which is capable of operating to provide an accurate narrow band pressure regulation. The pressure relief valve is disclosed in a fluid system which attenuates pressure spikes before they reach the pressure regulating valve.

---

This invention relates generally to a pressure relief valve and more particularly to a back pressure regulator incorporating unique means for obtaining good regulation and greatly improved stability characteristics and rapid response rates.

In general, the power gain and control of flow in the main valve of a pressure regulator is conventionally obtained by maintaining a substantial ratio between the actuating or moving portion of the power or actuating chamber, which is actuated upon fluid flowing therein from the pilot section or sensing chamber of the pressure regulator, and the area of the exhaust or vent valve. Hereafter, this ratio will be referred to as the "actuating ratio" or "area ratio." For example, this area ratio is customarily high, i.e., up to about 20/1. However, pressure regulators of this type are not generally desirable for certain applications such as aerospace applications because of the large size components required and the slow response resulting from waiting for large volumes to fill with a pressurized fluid.

Pronounced stability problems have also accompanied the use of conventional pressure relief valves or pressure regulators. For example, when the actuating area or actuating chamber used is proportioned close to the valve area, the valve becomes very unstable and will not function at all on very small ullages. Thus, valves of the usual design involve an "all or nothing" control and require considerable force to maintain control such as is available only by the use of a large actuating ratio or area ratio. Consequently, although large area ratios are used to provide sufficient power to operate the main valve of a pressure regulator, the effect of using such large operating forces results in the valve opening too wide followed by a reactive excessive closing with the ultimate effect that an oscillation between opening and closing results, thereby producing instability and destructive valve chattering.

In those cases where the sensing chamber of the pilot valve of a pressure relief valve is distantly removed from the point where the pressure within a pressure system is being controlled, the problem of instability is increased due to the existence of pressure spikes, i.e., large amplitude pressure surges of extreme short duration which might be as high as 200 p.s.i.a. and lasting for a period of 2 to 3 milliseconds, being transmitted to and causing actuation of the pilot valve and the main valve.

It has been found, however, that the problems of instability and slow response can be overcome through the use of a light weight, compact pressure relief valve incorporating a small actuating ratio or area ratio and a closeable variable venturi or orifice means. A variable venturi or orifice means, as used herein, is a flow control device including valve means which maintains a choke flow therethrough while maintaining a relatively constant fluid force on the valve means. At critical pressure, sonic flow results in the choke flow region. Additionally, where the sensing chamber or pilot valve is positioned a substantial distance from the point within a pressure system where the pressure is to be controlled, it has been found that the problems of instability can be further decreased through the use of unique means for dampening or preventing the passage of pressure spikes to the sensing or pilot chamber.

Accordingly, one of the principal objects of this invention is to provide a light weight, compact pressure relief valve having greatly improved stability and regulating characteristics.

Another object of this invention is to provide a pressure relief valve suitable for maintaining precision, narrow band pressure control.

Another object of this invention is to provide a pressure relief valve utilizing a closeable variable orifice or venturi means therein.

Another object of this invention is to provide a pressure relief valve incorporating means for preventing pressure spikes from being transmitted to the sensing or pilot chamber of the pressure relief valve.

Another object of this invention is to provide a pressure relief valve utilizing a variable venturi means including a low inertia valve means.

Another object of this invention is to provide a pressure relief valve utilizing a small area ratio.

Another object of this invention is to provide a pressure relief valve having a valve to control area ratio of more than one and less than 1.5.

Another object of this invention is to provide a pressure regulator incorporating therein a variable venturi means including a low inertia valve means and utilizing a small valve to control area ratio.

Another object of this invention is to provide a pressure relief valve incorporating means for maintaining choke flow therethrough while maintaining a relatively constant fluid force on the closing face of the main valve thereof for substantially all flow conditions.

Other objects, features and advantages of this invention will be apparent from the following detailed description.

The foregoing and related objects are achieved generally by providing a closeable variable venturi or orifice means including a low inertia main valve as a part thereof and a small area ratio. Additionally, the actuating chamber is constructed with a comparatively small volume to enhance the rate of response of the valve. The small area ratio is effected by utilizing an actuating chamber having a pressure responsive portion thereof which is preferably only slightly larger than the area of the main valve although the area ratio may vary from slightly larger than one to less than 1.5. A special means, preferably a non-restrictive or proximity check valve, is used for preventing pressure spikes from being transmitted from a pressurized medium to the sensing or pilot chamber and additionally for preventing a pressurized medium from being transmitted to the sensing chamber when the pressure at a predetermined point within a pressure system is less than a predetermined amount. A valve constructed in accordance with this invention easily handles pressures of about 200 p.s.i. although the entire unit weighs only about three pounds total. A beneficial configuration of a portion of the venturi or orifice means which cooperates with the main valve includes a first, relatively short, conically shaped surface part the extension of which forms an included angle with a longitudinal axis of the orifice means between approximately 30° and 60° and a second, conically shaped surface part interconnected with the first surface part the extension of which forms an included angle with the longitudinal axis of the orifice means between 15° and 25°.

For a better understanding of the present invention, reference is had to the following description taken in conjunction with the accompanying drawings wherein:

FIGURE 2 is a plan view of a pressure relief valve constructed in accordance with this invention;

FIGURE 3 is an elevational, cross-sectional view taken along line 3—3 of FIGURE 2;

FIGURE 4 is an elevational, cross-sectional view taken along line 4—4 of FIGURE 2;

FIGURE 5 is an elevational, cross-sectional view taken along line 5—5 of FIGURE 2; and FIGURE 6 is an enlarged, cross-sectional view of a portion of the seat of the main valve shown in FIGURE 3.

Figure 1:
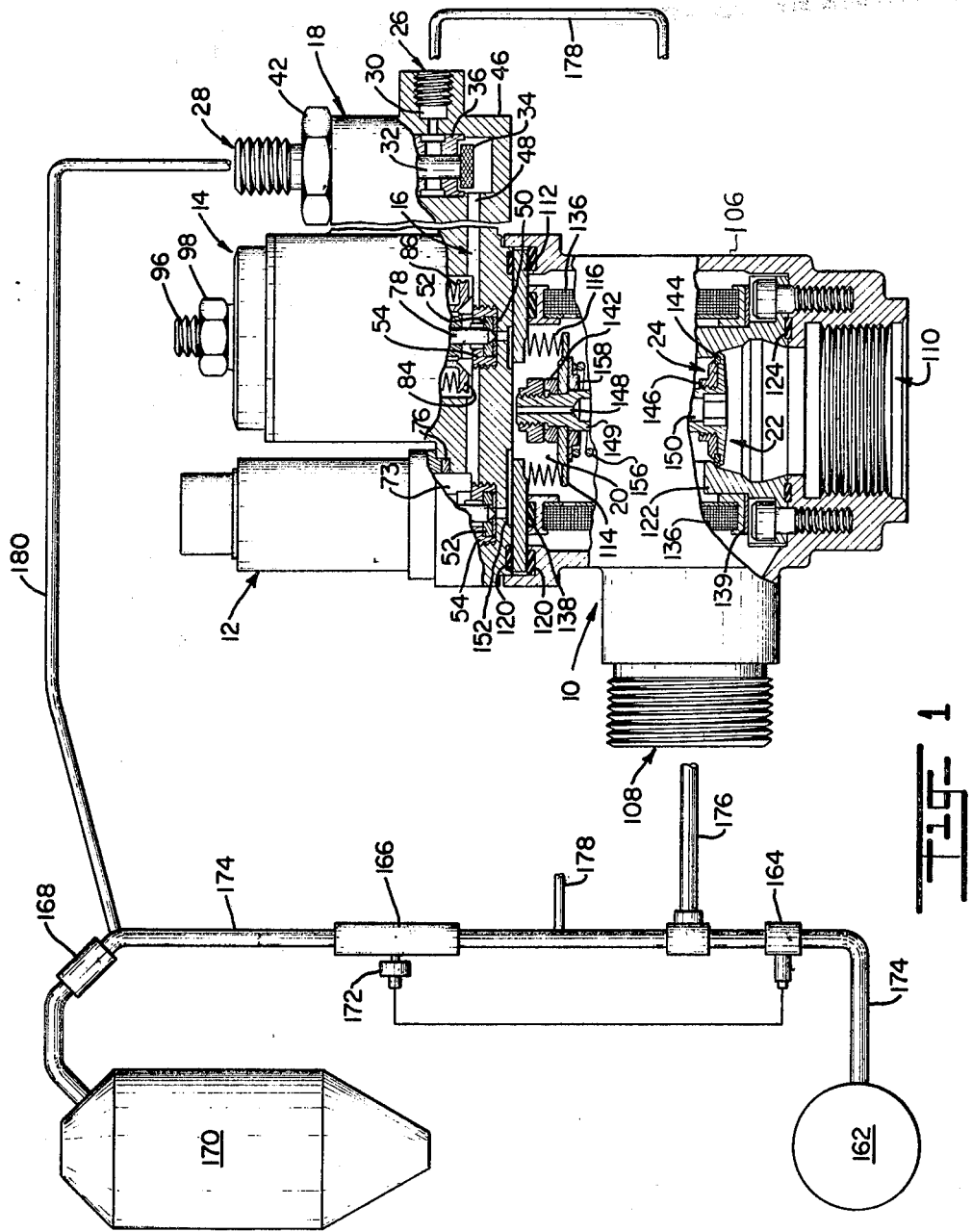
FIGURE 1 is schematic diagram, showing a pressure relief valve constructed in accordance with this invention installed within a pressure system, with the pressure relief valve being shown in partial cross-section and on an enlarged scale.

Referring now to the drawings, in FIGURE 1 is shown a pressure relief valve 10 mounted within a pressure system. The pressure relief valve 10 comprises a solenoid valve 12, and a pilot valve 14 including a sensing chamber 16, a means 18 for preventing pressure spikes from being transmitted to the sensing chamber 16, an actuating chamber 20, and a variable venturi means 22 including a main valve 24.

The means 18 for preventing pressure spikes that are generated within the pressure system from being transmitted to the sensing chamber has a short line inlet 26 and a long line inlet 28. An orifice 30 is formed in the short line inlet 26 and has an area of approximately 25% or less than the area of the long line inlet 28. Inlet 26 is disposed in communication with inlet 28 through chamber 32. The means 18 also includes a protective filter 34, a filter hold down and valve seat 36, a valve plate 38 (see FIGURE 4) preferably made from a plastic material such as tetrafluoroethylene, and a hair-spring 40. The valve plate 38 and hair-spring 40 function as a non-restrictive or proximity check valve, i.e., the check valve opens under the slightest amount of differential excess pressure in chamber 32 and closes under the slightest amount of differential excess pressure in line 28. The entire assembly is held in a leak tight arrangement by the threaded fitting 42 which is threaded into the bore 44 formed in the body 46 of the pressure relief valve 10. At the bottom of chamber 32 is formed a passage 48 which interconnects chamber 32 of means 18 with the sensing chamber 16.

Identical valve seats are provided for the solenoid 12 and the pilot valve 14 and comprise a seat 50 made from any suitable plastic such as tetrafluoroethylene, a pressure slip ring 52 and a threaded retainer-guide 54. For the solenoid 12, a plunger 56 (see FIGURE 5) has a valve end 58 which is guided in retainer-guide 54 and a pole end 60 of conical design disposed in the bore 62 of the base 64. Base 64 is made from a non-magnetic material and has a spool section 66 and a thin conical section terminating in a screw end 68. A similarly conical pole piece 70 completes a spool on which the coil 72 is wound. A chamber 73 is formed within the solenoid 12 above the valve end 58 and disposed in communication with the sensing chamber 16, see FIGURE 1. The entire assembly is secured to the body 46 of the pilot valve with a pair of bolts 74, see FIGURES 2 and 5, and is sealed by gasket 76.

The pilot valve 14 comprises a valve pin 78, an over ride spring 80 (see FIGURE 3) and a retainer 82 which is threaded into the lower movable terminal 84 of the bellows assembly. The bellows assembly comprises a metal bellows 86 having one end thereof welded to the movable terminal 84 and the other end thereof welded to the upper, fixed terminal 88. Low friction bushings 89 guide and align terminal 84, and a gasket 90 provides a seal against leakage. The bellows assembly is clamped firmly by slip ring 92 and threaded cap 94 which contains pressure adjusting screw 96 and lock nut 98. Screw 96 has a tool receiving recess 97 formed therein. A regulating spring 100 is compressed between spring rests 102 which are allowed to align and bear on a pair of balls 104. One of said balls 104 is seated in the adjusting screw 96 while the other of said balls 104 is seated in the upper surface of movable terminal 84.

The main flow control section of the pressure relief valve 10 comprises a body 106 having an inlet 108 and an outlet 110. A bellows assembly comprising an upper terminal 112, a lower movable terminal 114 and a bellows 116. The bellows 116 is welded to the terminals 112 and 114. The terminal 112 is clamped between the body 46 of the pilot valve and the body 106 of the main valve by any suitable means such as a plurality of bolts 118, see FIGURE 2, and is sealed against leakage by a pair of gaskets 120. A valve cage 122 is secured in the body 106 and sealed against leakage by a gasket 124. The valve cage 122 includes a guide bearing 126, and a low friction shoe-bushing 128, and a portion of the variable venturi means 22 which cooperates with the main valve 24. Said portion comprises a first, relatively short, conically shaped surface part or valve seat 130 interconnected with a second, conically shaped surface part 132. Said second conically shaped surface part 132 is of extended length and is interconnected with a cylindrically shaped surface area 134. Cylindrically shaped surface area 134 circumscribes an expanded flow area for normal operation of the main valve 24 when actuated by the solenoid 12. Otherwise, the main valve 24 normally does not extend into the area circumscribed by said surface area 134 during operation of the presesure relief valve.

A protective filter 136 is interposed between the terminal 112 and the valve cage 122 and is provided with gasket seals 138 and 139. The main valve 24 is guided in bearing 126 and fastened to lower movable terminal 114 by means of a nut 140. A seal ring 142 is used to effect a leak-tight connection. At the opposite end, a seat seal 144 is keyed into a groove formed in the main valve 24 and is maintained therein by the retainer 146. A control orifice 148 is formed in the stem 149 of the main valve 24. The control orifice is disposed in communication with the outlet 110 by passage 150. Passages 152 interconnect the chamber 73 of the solenoid valve 12 and the sensing chamber 16 of the pilot valve with the actuating chamber 20 which is circumscribed in part by bellows 116 and the lower movable terminal 114. The lower movable terminal 114 is a pressure responsive member and is secured or attached to the main valve 24 by valve stem 149 for movement therewith. The lower movable terminal 114 and the attached main valve 24 are biased in an upwardly direction by spring 156 which is disposed between spring rests 158 and 160. The upper spring rest 158 is mounted beneath the lower movable terminal 114 and the lower spring rest 160 is seated upon an upper portion of the valve cage 122. Thus, the main valve 24 is biased toward the closed position by spring 156.

The pressure system shown in FIGURE 1 in which the pressure relief valve 10 is mounted includes a source or supply of pressurized fluid in sphere or container 162, a solenoid valve 164, an accumulator 166, a check 168, a tank or container 170, a pressure switch 172 and a conduit 174. A conduit 176 interconnects conduit 174 and inlet 108. Conduit 176 is connected to conduit 174 downstream of the solenoid valve 164 and upstream of the accumulator 166. Another conduit 178, which serves as a pressure sensing conduit, interconnects conduit 174 with inlet 26 of means 18. Conduit 178 is connected to conduit 174 at a point downstream of the solenoid valve 164 and upstream of the accumulator 166. Another conduit 180 interconnects conduit 174 and the long line inlet 28 of means 18. Conduit 180 connects with conduit 174 at a point immediately upstream of the check valve 168. Check valve 168 is located in close proximity to the inlet to tank 170. Pressure switch 172 is electrically connected to the solenoid valve 164.

The operation of the pressure relief valve constructed in accordance with this invention is now described. Referring now to the drawings and particularly to FIGURE 1, a supply of pressurized fluid such as helium, which may be pressurized between 300 to 3700 p.s.i., is contained in sphere 162. A pressure switch 172 is mounted on and senses off the ullage of the accumulator 166 and is electrically connected to solenoid valve 164. Conduit 178 connects with conduit 174 at a point near the point of interconnection of conduit 176 and conduit 174. The total length of the conduit between the interconnection of conduits 174 and 176 and the inlet port 28 is substantially longer than the length of either conduits 178 or 176. For example, in one aerospace application, the total length of the conduit from the long line inlet 28 of means 18 to the interconnection of conduits 174 and 176 is about 100 inches, while the length of conduit 178 is about 10 inches and the length of conduit 176 is about 5 inches.

Since an understanding of the operation of the overall pressure system shown in FIGURE 1 will result in a better understanding of the operation of the pressure relief valve 10, the operation of the pressure system as a whole is now described. The pressure system shown in FIGURE 1 is suitably designed for use in an aerospace application. Prior to launch, the container 162 is pressurized with helium to about 3600 p.s.i. and the tank 170 is filled within about 4 cubic feet of the total volume thereof. An additional pressurization of the tank 170 to a predetermined pressure such as 90 p.s.i. for checkout is initiated by energizing the solenoid valve 164. The solenoid valve 164 may be shut off by a separate ground pressurization checkout switch (not shown). In the event that this separate ground pressurization checkout switch should fail to open or the solenoid valve 164 should fail to close, an upper launch limit switch (not shown), similar to pressure switch 172 and connected to the solenoid 12, will open the main valve 24 at a predetermined pressure such as 120 p.s.i.a. and vent or exhaust the pressurized helium overboard through outlet 110 thereby preventing the pressure in tank 170 from rising above the upper launch limit. This is the sole function of the solenoid 12 of the pressure relief valve 10.

In flight, the flight pressurization system is energized, the solenoid valve 164 is energized, and pressure is rapidly brought up in tank 170. Pressure switch 172 closes the solenoid valve 164 at a maximum predetermined pressure such as 166 p.s.i.a. and opens same when the pressure reaches a predetermined minimum such as 160 p.s.i.a. As the pressurized medium is withdrawn from tank 170, the solenoid valve 164 begins cycling in short bursts of gas flow. This cycling is controlled by pressure switch 172.

At the start of the flight, with the container 162 pressurized to approximately 3600 p.s.i., the solenoid valve 164 flows approximately 10 times more than the amount of pressurized fluid required to maintain proper pressurization of tank 170. This high flow, even though in short bursts, produces a high differential pressure in the line between the solenoid valve 164 and the check valve 168. In addition, a shock wave with pressure spikes as high as 200 p.s.i.a. are generated within the conduit 174. The pressure relief valve had to be located where it was easily accessible, which was on the main frame close to the skin, and yet still sense the pressures occurring upstream of the check valve 168 which is normally positioned a considerable distance away. The pressure relief valve 10 was supposed to regulate at altitude within a narrow range such as between 181 to 192 p.s.i.a. and yet not become actuated as a result of the pressure spikes being generated by the opening of solenoid valve 164. Further, the pilot valve must meet critical time response requirements generally in the range of 3 milliseconds both for opening and closing.

When the tank 170 has been brought up to flight pressure, the solenoid valve 164 is energized and, for the fraction of a second that the pressurized helium is flowing through conduit 174, a differential pressure of several pounds exists in the conduit 174. Thus, conduit or sensing line 180 will be about 10 p.s.i. lower than conduits 176 and 178. The effect of the differential pressure between the conduits 178 and 180 results in a comparatively small amount of gas flowing upwardly through means 18 and outwardly from inlet 28 and on through conduit 180. If no malfunction of the solenoid valve 164 occurs, the pressure system is shut off at a predetermined pressure such as 166 p.s.i.a. and all the pressures become stabilized.

However, as soon as the solenoid valve 164 opens again, the high pressure spike generated plus the differential in pressure start up the conduit 174. This pressure spike is transmitted almost simultaneously to the inlet 108 of the pressure valve and the orifice 30 formed in inlet 26. Upon passing through orifice 30, the pressure spike is decreased to a very small fraction of its former value and thus a pressure pulse of approximately only 1 p.s.i. moves upwardly through the means 18 into the conduit 180. As this pressure spike only lasts about 2 milliseconds, the pressure at the inlet 26 quickly drops to about the normal differential pressure above the static line pressure. In the meantime, the shock wave or pressure spike is continuing upwardly through conduit 174, through the accumulator 166, which protects the pressure switch 172 from the effects of the shock wave, and to the check valve 168. The shock wave also enters the sensing line 180 and meets the upcoming pressure pulse, reverses it and causes it to go back down the line 180 to inlet 28, closes the non-restrictive check valve mounted within means 18, and then bounces back up through means 18 into conduit 180 where it becomes dissipated. The non-restrictive check valve mounted within the means 18 then opens and the normal differential pressure again exists at the orifice 30 until the solenoid valve 164 is shut off. The time cycle from the solenoid valve 164 to the non-restrictive check valve within means 18 is only about 6 milliseconds but the overlap has dissipated the shock wave without same having entered the sensing chamber 16 to affect the operation of the pilot valve 14. This cycle is repeated every time the solenoid valve 164 opens. Consequently, as long as the pressure system functions normally, the main valve 24 is never called upon to operate.

In the event that the solenoid valve 164 should fail to close, the pressure will rise in the pressure system, including the tank 170, at an extremely rapid rate such as 150 p.s.i. per second. Even at this rapid rise rate, a differential pressure still exists between the solenoid valve 164 and the check valve 168. As the pressure approaches a predetermined value such as 184 p.s.i., it starts to lift bellows terminal 84 thereby overcoming the preload of the control spring 100 and taking up the overtravel between the shoulder on the valve pin 78 and retainer 82. At cracking pressure, such as 184 p.s.i., valve pin 78 lifts off valve seat 50 and gas from the sensing chamber 16 flows or vents into actuating chamber 20 thereby developing pressure therein and initiating flow outwardly through orifice 148 and passage 150. As the pressure increases in the pilot or sensing chamber 16, the valve pin 78 is further elevated and gas flows more rapidly into actuating chamber 20 than the flow thereof out of orifice 148 and passage 150 resulting in the development of a pressure within the actuating chamber 20 of sufficient magnitude to overcome the force being exerted by the spring 156 and the pneumatic loading on the lower surface of member 114. As a result, the main valve 24 starts to open. Upon opening of main valve 24, the gas begins to vent past the periphery of the main valve 24. As the pressure continues to rise in the chamber 32 of means 18, the sensing chamber 16 and the actuating chamber 20, the main valve 24 will open to a larger degree until the pressures and flows in the entire system reach equilibrium.

All the above actions may be occurring in approximately three milliseconds or less and at the instant the solenoid valve 164 opens, the pressure at the inlet 108 might be as high as 200 p.s.i. while the pressure in sensing line 180 might be only 184 p.s.i. As soon as the main valve 24 opens, the pressure at the main valve inlet 108 and within the sensing line of conduit 178 drops. The 200 p.s.i. pressure wave continues up the line to check valve 168 and through the conduit 180 resulting in an increase in pressure at the inlet 28 of means 18. In the meantime, the pressure has dropped at the inlet 26 of means 18 and the reverse flow has instantly closed the non-restrictive check valve mounted within means 18. The next instant, the pressurized medium or fluid flowing through conduit 178 is transmitted to the sensing chamber 16 of the pilot valve and after about 15 to 20 milliseconds, the pressures in the sensing lines of conduits 178 and 180 become balanced. As a consequence, there is no further flow past the check valve 168 and no differential pressure exists in the conduit 174. As long as the solenoid valve 164 remains open, primary sensing will then be by a relatively short line or conduit 178.

With respect to the type of failure indicated, the gas flow will gradually decrease and as it does so the pressure level will drop thereby bringing about a gradual closing down of the pilot valve 14, a decreasing of the pressure in actuating chamber 20 and a closing of the main valve 24 in accordance with the flow existing an any instant. Should the gas flow cease suddenly, a drop in pressure from the open main valve 24 would be detected immediately in the conduit 178. This drop in pressure would be transmitted to the sensing chamber 16 and result in a closing of the pilot valve 14, a bleeding of the actuating chamber 20 through the orifice 148 and passage 150, and a closing of the main valve 24. All of this would occur in less than about three milliseconds.

Important factors contributing to the successful operation of the pressure relief valve 10 are due to the overall sensing system and the power gain modulation control of the main valve 24. From a power gain viewpoint, pressure change in the sensing line 178 of only 2 p.s.i. is all that is required to provide flow from a cracking to a full opening of main valve 24. Further, about 70% of this 2 p.s.i. pressure range is used in cracking or opening the pilot while the remaining portion is used for modulating the main valve 24.

In designing the function of the main valve 24, it has been found that excellent modulation control is obtained by maintaining the dynamic flow forces substantially constant on the main valve 24 under substantially all flow conditions and by maintaining a flow that is substantially directly proportional to pressure change. In other words, a relatively constant fluid force must be maintained on the main valve 24 during all flow conditions and the mass flow should be proportional to the linear movement of the valve except when the main valve is actuated by the solenoid 12.

The foregoing is accomplished by utilizing a main valve which has a narrow portion of a seat seal contacting the surface part 130 substantially at right angles. The surface part 130 is relatively short and conically shaped. An extension of the surface part 130 forms an included angle with the longitudinal axis of the orifice means between approximately 30 and 60° and preferably between approximately 40° and 50° although excellent results have been obtained with an included angle of approximately 45°, i.e., 45°±1°. The seat contact is very short in width and preferably less than 0.025 inch in width to provide the least possible change in seating area between a closed and open valve condition. The first surface part 130 interconnects and blends with the second surface part which is also conically shaped. An extension of the second surface part forms an included angle with the longitudinal axis of the orifice means between approximately 15° and 25° and preferably between 15° and 20° although excellent results have been obtained with an included angle of approximately 18°, i.e., 18°±½°. The seat seal 144 engages the first surface part 130 with the lower portion thereof being disposed at the point where the first surface part 130 interconnects and blends with the second surface part 132, see FIGURE 6. Consequently, when the main valve 24 cracks open and moves about 0.005 inch, the flow restriction area is positioned at the periphery of seat seal 144. For the balance of the stroke, which in this application does not exceed about ¼″ unless solenoid 12 is actuated, a flow restriction or choke flow occurs between the periphery of the seat seal 144 and the conically shaped area 132. At the maximum controlling extension of the main valve 24, which is at the break between the conically shaped area 132 and the cylindrical shaped area 134, the area is designed to pass the specified maximum weights of gas at the minimum specified pressure. Thus, it will be readily apparent, in view of the foregoing, that for any intermediate position of the main valve 24, the flow will be almost directly proportional to the extension of the valve.

As previously indicated, the pressure relief valve 10 must be capable of responding or operating at extremely rapid rates. It was found that the use of a small area ratio between the power or actuating chamber 20 and the main valve 24 produced a greatly improved response rate. For example, the ratio of the projected area of the lower movable terminal 114 to the projected area of the main valve 24, both of said parts being exposed to the pressure existing within conduit 174 to produce force resultants in the opposite directions, of more than 1 but less than 1.5 was found to produce rapid response rates of the main valve 24 although a ratio of approximately 1.05 to 1.30 is preferred. Excellent results have been obtained where an area ratio of approximately 1.05 is used. This unique area ratio, which is substantially less than the area ratio of 20 to 1 found in conventional pressure relief valves, in combination with the use of a small actuating chamber 20 and a low inertia main valve 24 combined to produce extremely fast main valve actuation rates.

It will be understood that the orifice 148 and passage 150 need not be installed through the main valve 24 as shown but may be suitably positioned in any one of several ways.

When the linear characteristics of the pilot valve are combined with the linear characteristics of the closing spring 156 and the bellows 116, it will be apparent that the response of the valve is almost perfectly linear. Further, a valve constructed in accordance with this invention also eliminates unbalancing forces under varying flows. Additionally, since the choke flow or maximum velocity change occurs at the periphery of the main valve 24, it will now be apparent that a relatively constant pressure force is maintained on the upstream side of the main valve 24 under substantially all flow conditions. Although there is a slight effect of impact pressure under maximum flow conditions, this effect is almost evenly balanced by the back pressure on the opposite side of the valve.

From the foregoing, it will be apparent that the invention provides a pressure relief valve that is uniformly stable under all flow conditions, extremely fast acting without instability and compact and light weight in construction.

It is to be understood that this invention is not limited to the exact embodiments of the device shown and de-

What is claimed is:

1. A pressure relief valve comprising pressure sensing means, a biased pressure responsive means adapted to have a first side thereof disposed in communication with said pressure sensing means, a biased valve means for placing said pressure sensing means in communication with the first side of said pressure responsive means, means for continuously venting the first side of said pressure responsive means, and a closable variable venturi means including a valve means attached to and movable with said pressure responsive means, one side of said attached valve means and a second side of said pressure responsive means being adapted to be disposed in communication with a pressurized medium to produce opposed force resultants, the area ratio between the second side of said pressure responsive means and said one side of said attached valve means being more than one but less than 1.5, means for preventing pressure spikes from being transmitted to said pressure sensing means.

2. A pressure relief valve as described in claim 1 in which said pressure spike preventing means includes a proximity check valve.

3. A pressure relief valve comprising pressure sensing means, a biased pressure responsive means adapted to have a first side thereof disposed in communication with said pressure sensing means, a biased valve means for placing said pressure sensing means in communication with the first side of said pressure responsive means, means for continuously venting the first side of said pressure responsive means, and a closable variable venturi means including a valve means attached to and movable with said pressure responsive means, one side of said attached valve means and a second side of said pressure responsive means being adapted to be disposed in communication with a pressurized medium to produce opposed force resultants, the area ratio between the second side of said pressure responsive means and said one side of said attached valve means being more than one but less than 1.5, said variable venturi means includes a surface portion cooperating with said attached valve means, said surface portion comprising a first, relatively short, conically shaped surface part the extension of which intersects the longitudinal axis of said venturi means to form an included angle between approximately 30° and 60° and a second, conically shaped surface part interconnected with said first surface part, the extension of said second surface part intersecting the longitudinal axis of said venturi means to form an included angle between approximately 15° and 25°.

4. A pressure relief valve as described in claim 3 in which the extension of the first surface part of said surface portion forms an included angle between approximately 40° and 50° with the longitudinal axis of said venturi means and the extension of said second surface part of said surface portion forms an included angle between approximately 15° and 20° with the longitudinal axis of said venturi means.

5. A pressure relief valve as described in claim 4 in which the extension of said first surface part of said surface portion forms an included angle of approximately 45° with a longitudinal axis of said venturi means and the extension of said second surface part of said surface portion forms an included angle of approximately 18° with the longitudinal axis of said venturi means.

6. A pressure relief valve as described in claim 4 in which said attached valve means includes a seal portion the lower portion of which seats against said surface portion approximately at the intersection of said first and second surface parts.

7. A pressure relief valve comprising a pressure sensing chamber adapted to be disposed in communication with a pressurized medium of a pressure system when the pressure at a predetermined point within a pressure system exceeds a predetermined amount; a biased pressure responsive member adapted to have a first side thereof disposed in communication with a pressurized medium contained within said sensing chamber and a second side thereof disposed in communication with a pressurized medium of a pressure system; biased valve means for placing said sensing chamber in communication with said first side of said pressure responsive member; means for continuously venting the first side of said pressure responsive member; a closable variable orifice means including a low inertia valve means; said low inertia valve means being attached to and movable with said pressure responsive member and mounted for translatory movement within said orifice means, one side of said low inertia valve means being adapted to be disposed in communication with a pressurized medium of a pressure system, the area ratio of the second side of said pressure responsive member to the area of the said one side of said low inertia valve means adapted to be disposed in communication with a pressurized medium of a pressure system being more than 1 but less than 1.5, the simultaneous exposure of said second side of said pressure responsive member and the said one side of said low inertia valve means to a pressurized medium of a pressure system providing force resultants in opposite directions; and means for preventing a pressurized medium of a pressure system from being transmitted to the sensing chamber when the pressure at a predetermined point within a pressure system is less than a predetermined amount and preventing pressure spikes from being transmitted from a pressurized medium of a pressure system to said sensing chamber.

8. A pressure relief valve as described in claim 7 in which said area ratio varies from approximately 1.05 to 1.30.

9. A pressure relief valve as described in claim 7 in which said area ratio equals approximately 1.05.

10. A pressure relief valve as described in claim 7 in which the portion of said orifice means that cooperates with the low inertia valve means comprises a first, relatively short, conically shaped surface part the extension of which intersects the longitudinal axis of said orifice means to form an included angle between approximately 30° and 60° and a second, conically shaped surface part interconnected with said first surface part, the extension of said second surface part intersecting the longitudinal axis of said orifice means to form an included angle between approximately 15° and 25°.

11. A pressure relief valve as described in claim 7 in which the portion of said orifice means that cooperates with said low inertia valve means comprises a first, relatively short, conically shaped surface part the extension of which forms an included angle between approximately 40° and 50° with the longitudinal axis of said orifice means and a second, conically shaped surface part interconnected with said first surface part, the extension of which forms an included angle between approximately 15° to 20° with the longitudinal axis of said orifice means.

12. A pressure relief valve comprising a pressure sensing chamber adapted to receive a pressurized medium of a pressure system when the pressure at a predetermined point within the pressure system exceeds a predetermined amount; a continuously vented actuating chamber having a biased pressure responsive portion attached to a low inertia valve means, a surface portion of each of said pressure responsive portion and said low inertia valve means both being adapted to be disposed in communication with a pressurized medium of a pressure system to provide opposed force resultants, the area ratio of said pressure responsive portion exposed to a pressurized medium of a pressure system to said low inertia valve means exposed to a pressurized medium of a pressure system being more than one but less than 1.5; a passage interconnecting said chambers and having biased valve means disposed therein, said biased valve means being responsive to the pressure existing within the sensing chamber for controlling the flow from said sensing chamber to said actuating chamber; a closable variable venturi means including the low inertia valve means as a part thereof; and means for preventing the pressurized medium of a pressure system from being transmitted to the sensing chamber when the pressure at a predetermined point within a pressure system is less than a predetermined amount and preventing pressure spikes from being transmitted from a pressurized medium of a pressure system to said sensing chamber.

13. A pressure relief valve as described in claim 12 in which said means for preventing a pressurized medium and pressure spikes from being transmitted to the sensing chamber includes a three port nonrestrictive check valve having two ports on one side thereof one of which is adapted to be disposed in communication with a pressurized medium of a pressure system and the other being interconnected with said sensing chamber, while the remaining port on the other side is adapted to be placed in communication with a pressure at a predetermined point within a pressure system.

References Cited
UNITED STATES PATENTS

| | | | |
|---|---|---|---|
| 633,662 | 9/1899 | Schneible | 137—489.5 XR |
| 2,328,279 | 8/1943 | Jones | 137—489.5 XR |

FOREIGN PATENTS

| | | |
|---|---|---|
| 1,085,001 | 7/1960 | Germany. |
| 549 | 1856 | Great Britain. |
| 1,016,779 | 4/1950 | France. |

M. CARY NELSON, Primary Examiner

ROBERT J. MILLER, Assistant Examiner